United States Patent [19]

Jeppe

[11] Patent Number: 5,433,307
[45] Date of Patent: Jul. 18, 1995

[54] CLUTCH PLATE FOR A FRICTION CLUTCH OF A MOTOR VEHICLE HAVING A RADIALLY ELASTIC PLASTIC RING

[75] Inventor: Harald Jeppe, Schweinfurt, Germany

[73] Assignee: Fichtel & Sachs AG, Schweinfurt, Germany

[21] Appl. No.: 119,429

[22] Filed: Sep. 9, 1993

[30] Foreign Application Priority Data

Sep. 10, 1992 [DE] Germany .................. 9212203 U

[51] Int. Cl.⁶ .................... F16D 3/14; F16D 3/66
[52] U.S. Cl. ................. 192/106.1; 192/106.2; 464/68
[58] Field of Search .............. 192/106.1, 106.2; 464/68

[56] References Cited

U.S. PATENT DOCUMENTS

| | | |
|---|---|---|
| 3,861,764 | 1/1975 | Adams . |
| 4,433,771 | 2/1984 | Caray . |
| 4,453,838 | 6/1984 | Loizeau . |
| 4,635,780 | 1/1987 | Wiggen . |
| 4,640,398 | 2/1987 | Kolb et al. . |
| 4,651,857 | 3/1987 | Schraut et al. . |
| 4,667,801 | 5/1987 | Fischer et al. . |
| 4,684,007 | 8/1987 | Maucher . |
| 4,697,682 | 10/1987 | Alas et al. . |
| 4,763,767 | 8/1988 | Lanzarini et al. . |
| 4,890,712 | 1/1990 | Maucher et al. . |
| 5,016,744 | 5/1991 | Fischer et al. . |
| 5,117,959 | 6/1992 | Graton ................ 464/68 X |
| 5,217,409 | 6/1993 | Dalbiez ............... 192/106.1 X |
| 5,238,096 | 8/1993 | Ament et al. ........ 192/106.2 |
| 5,240,458 | 8/1993 | Linglain et al. ...... 192/106.2 X |
| 5,246,398 | 9/1993 | Birk et al. ........... 464/68 X |
| 5,249,660 | 10/1993 | Feldhaus et al. ..... 192/106.2 |
| 5,251,736 | 10/1993 | Jeppe et al. ......... 192/106.1 X |
| 5,322,149 | 6/1994 | Szadkowski .......... 192/106.1 X |

FOREIGN PATENT DOCUMENTS

| | | |
|---|---|---|
| 1208127 | 2/1960 | France . |
| 1422619 | 11/1965 | France . |
| 1597398 | 6/1970 | France . |
| 2186091 | 1/1974 | France . |
| 2496786 | 6/1982 | France . |
| 2624236 | 6/1989 | France . |
| 3340896 | 5/1985 | Germany . |
| 3532951 | 3/1987 | Germany . |
| 3545231 | 6/1987 | Germany ............ 192/106.1 |
| 3921283 | 8/1990 | Germany . |
| 2080488 | 2/1982 | United Kingdom . |
| 2261718 | 5/1993 | United Kingdom . |

Primary Examiner—Andrea L. Pitts
Attorney, Agent, or Firm—Nils H. Ljungman & Associates

[57] ABSTRACT

A friction clutch, in particular for a motor vehicle, the friction clutch comprising a clutch plate, the clutch plate comprising a hub with a hub plate and two cover plates disposed on opposite sides of the hub plate. A plastic ring is disposed on one side of the hub plate. The inner portion of the plastic ring is disposed at the hub plate, the outer portion of the plastic ring is disposed at a central opening of the first cover plate. The outer portion of the plastic ring comprises a resilient biasing member which resilient biasing member is disposed to resiliently bias the first cover plate away from the outer portion of the plastic ring.

18 Claims, 7 Drawing Sheets

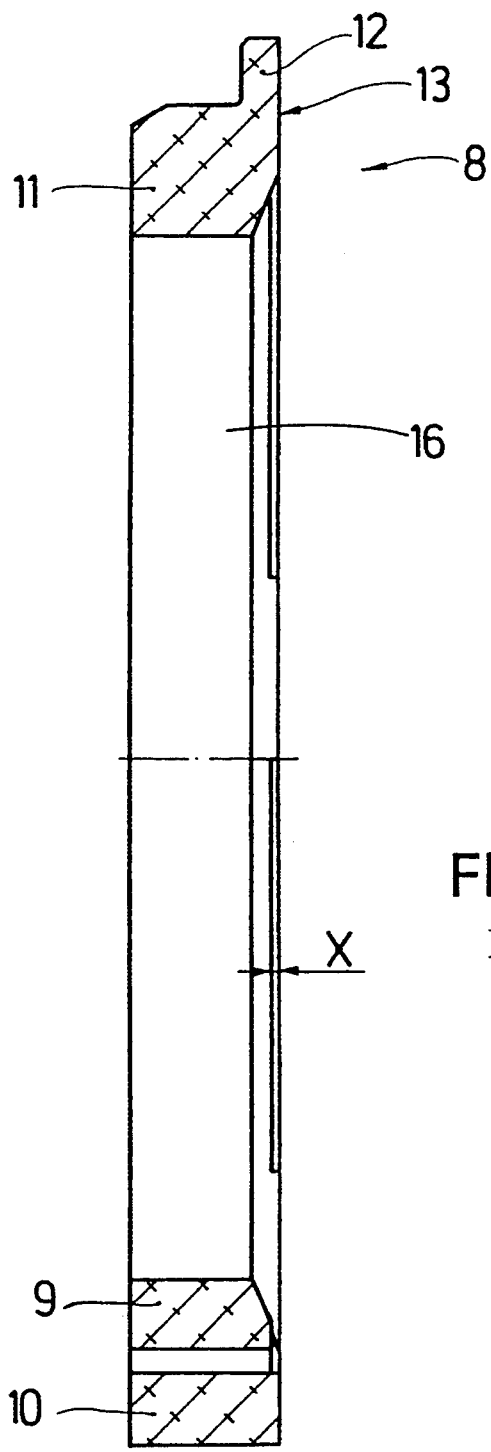
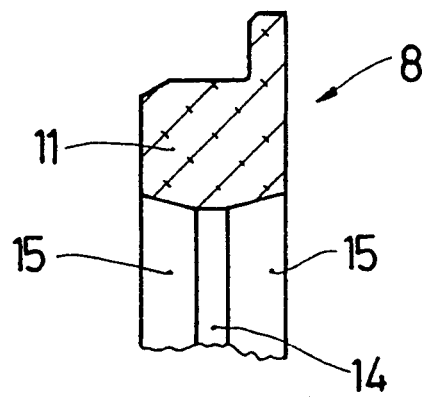
FIG. 3
III-III
FIG. 4

III-III

CLUTCH PLATE FOR A FRICTION CLUTCH OF A MOTOR VEHICLE HAVING A RADIALLY ELASTIC PLASTIC RING

BACKGROUND OF THE INVENTION

1. Field of the Invention

This invention relates to a clutch plate with torsional vibration damper, in particular for friction clutches of motor vehicles. Such a friction clutch typically includes a hub with hub plate and cover surfaces located on both sides of the hub plate which are rigidly connected to one another and can be rotated by a certain amount in relation to the hub plate against the force of springs, whereby the radial guidance of the parts which can rotate in relation to one another is performed by means of the one cover plate. A plastic ring is inserted into a central opening of the cover plate, whereby the plastic ring is radially elastic within limits and sits on a cylindrical portion of the hub.

2. Background Information

German Unexamined Patent Application 39 21 283, which corresponds to U.S. Pat. No. 5,016,744 entitled "Clutch Disc for a Friction Clutch," discloses such a plastic ring. For radial resilience, this plastic ring has a cross section which is approximately S-shaped, and its circumference is divided into several blocks which are separated from one another by slots which run in a radial direction.

With such a known configuration, the radial spring travels are relatively small, and the contact with the hub, due to the interruptions along the circumference, is not without its problems, in terms of the uniform low generation of friction.

OBJECT OF THE INVENTION

The object of the present invention is therefore to significantly improve a clutch plate of the type described above, so that on one hand, relatively large radial spring travels are possible, and on the other hand, the basic friction which can be achieved with the arrangement can be kept as constant as possible.

SUMMARY OF THE INVENTION

This object is achieved by the present invention as a result of characteristics disclosed hereinbelow. An inner portion of a plastic ring, which inner portion is closed around its circumference, provides for the uniform generation of friction under essentially all load conditions, and makes it possible to achieve a long service life in this area. Radially resilient tongues, curved in an arc-shape, located radially outside the closed area and running in a circumferential direction, produce the radial elasticity of the plastic ring with respect to the cover plate. These tongues are preferably designed so that, at the maximum spring travel, there is approximately the same stress at each point in the material. Thus a uniform elasticity is achieved and the friction force generated for the basic friction is kept essentially constant, regardless of the load.

In accordance with an additional feature of the invention, each tongue is connected by means of a block in its one circumferential terminal area with the inner area of the plastic ring, and each block of diameter D4 of the inner area is designed so that it is solid up to the diameter D3, and the diameter D3 is smaller by the magnitude of the maximum spring travel than the central opening in the cover plate with the diameter D2. In this manner, the spring travel is precisely limited, and the tongues are protected against overloading. The designations "D2", "D3", and "D4" will be discussed in more detail further below.

The plastic ring, for axial guidance in relation to the inner wall of the cover plate, is also preferably provided, at least in the area of the blocks, with radially projecting lugs which provide axial fixing in relation to the cover plate. In this manner it becomes possible to also provide the individual tongues with one or more radially-projecting lugs for axial fixing.

The invention also teaches that the inner area of the plastic ring is preferably recessed in relation to the surface of the hub plate facing the hub. In this manner, it is guaranteed that in the event of the application of an axial force to the plastic ring by the zig-zag spring which generates the basic friction, the inner area, enclosed on the circumference, is not affected.

In an additional advantageous configuration of the invention, the inner area of the plastic ring, toward the cylindrical area of the hub, is preferably provided with an axially narrow contact surface, by locating bevels on both axial sides. This configuration of the plastic ring is advantageous in applications in which an angular offset can occur between the drive shaft of the motor vehicle and the crankshaft. It is thereby possible to assume these possible angular positions without damaging the plastic ring on one hand, and without influencing the generation of friction at this point on the other hand.

The plastic ring used in this application is preferably made of reinforced plastic. That means that there are preferably additives, e.g. in the form of fibers such as glass fibers, to increase the strength of the plastic ring. These glass fibers, for example, can account for up to 30 per cent of the weight of the plastic ring. As a result of these additives, the dimensional stability and elasticity of the plastic ring are increased.

One aspect of the invention resides broadly in a friction clutch in a transmission, in particular for a motor vehicle, the friction clutch comprising a clutch plate, the clutch plate comprising: a hub; the hub comprising a hub plate; the hub plate comprising a first side and a second side; a first cover plate being disposed at the first side of the hub plate; a second cover plate being disposed at the second side of the hub plate; a plastic ring disposed between the hub and the first cover plate, the plastic ring comprising an inner portion and an outer portion; the inner portion being disposed at the hub; the outer portion of the plastic ring comprising: resilient biasing means disposed at the outer portion of the plastic ring; the biasing apparatus being disposed to resiliently bias the first cover plate away from the outer portion of the plastic ring.

BRIEF DESCRIPTION OF THE DRAWINGS

The invention is explained below in greater detail, with reference to one embodiment illustrated in the accompanying drawings, which:

FIGS. 2a and 2b are substantially the same views as FIGS. 2 and 2aa but show additional components;

FIG. 3 shows a cross section along Line A—A in FIG. 2;

FIG. 4 shows a variant of the plastic ring illustrated in FIG. 3, in cross section;

DESCRIPTION OF THE PREFERRED EMBODIMENT

Figure 1:
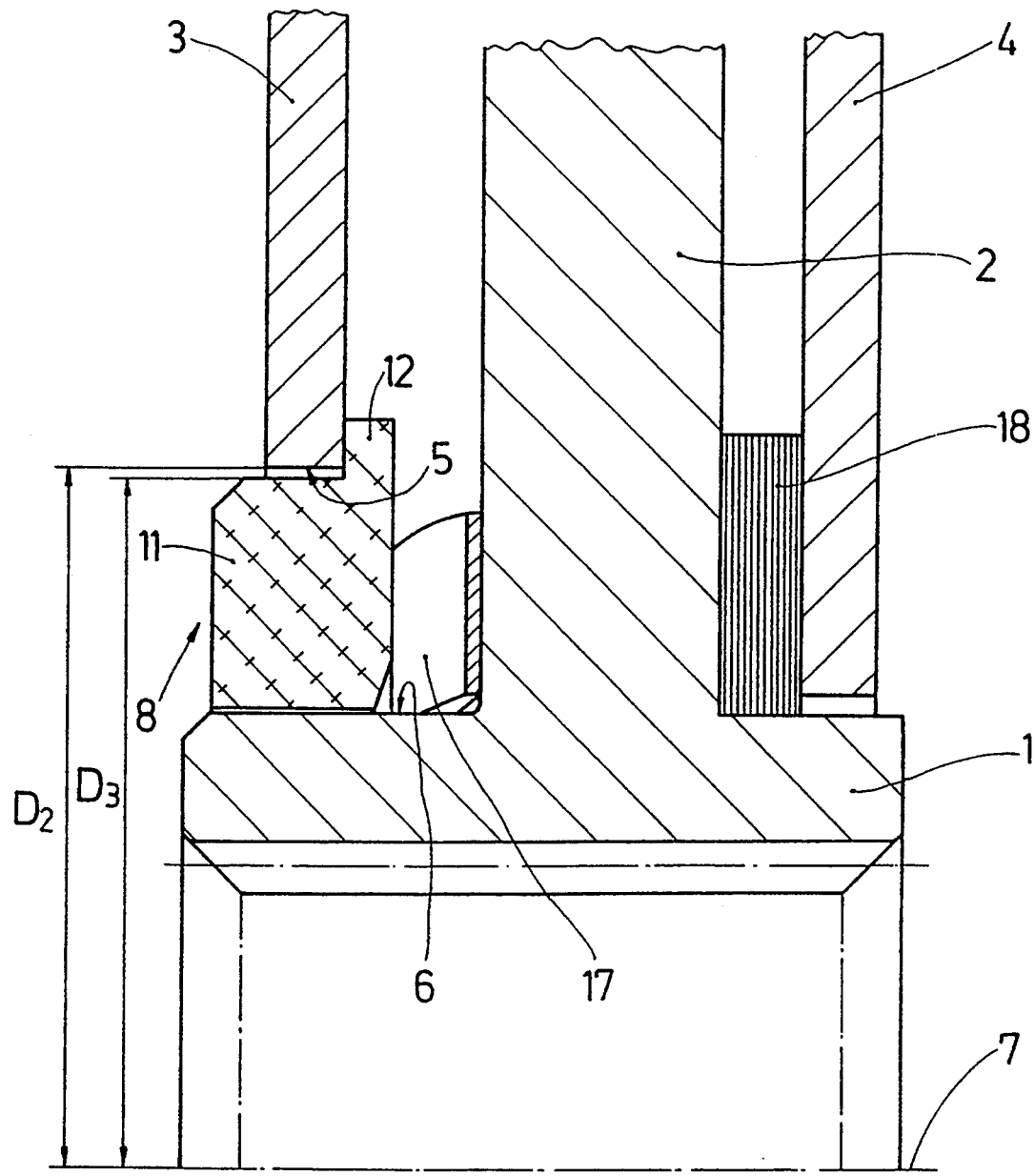
FIG. 1 shows a partial longitudinal section through a clutch plate in the vicinity of the hub.

FIG. 1 shows the overall situation in a partial longitudinal section of a clutch plate. A hub 1 with a radially projecting hub plate 2 is oriented concentric to an axis of rotation 7. In its inner circumferential area, the hub 1 typically may be provided with teeth, by means of which it is engaged with teeth (not shown) on a drive shaft. On both sides of the hub plate 2 are radially inner terminal areas of cover plates 3 and 4, which are firmly connected to one another in a radially outer area, and are held at a distance from one another. The friction linings of the clutch plate may typically be located on one of the cover plates 3 and 4 (not shown). Between the hub plate 2 and the cover plates 3 and 4 there are springs (not shown in FIG. 1) which, when torque is applied, allow a relative rotational movement between the hub plate 2 and the two cover plates 3 and 4. To guide the two cover plates 3 and 4 in relation to the hub 1, the hub 1 has a cylindrical area 6 on one side of the hub plate 2. The two cover plates 3 and 4 are preferably braced against this cylindrical area 6 by means of a plastic ring 8, which is inserted in a central opening 5 of the cover plate 3. The plastic ring 8 is generally axially stressed by a zig-zag spring 17, which is braced against the hub plate 2. On the opposite side, between the cover plate 4 and the hub plate 2, there is a friction ring 18 which is axially stressed by the force of the zig-zag spring 17 and generates a basic friction. The plastic ring 8 also contributes to this basic friction as a result of its contact with the hub 1 in the cylindrical area 6.

Figure 1A:
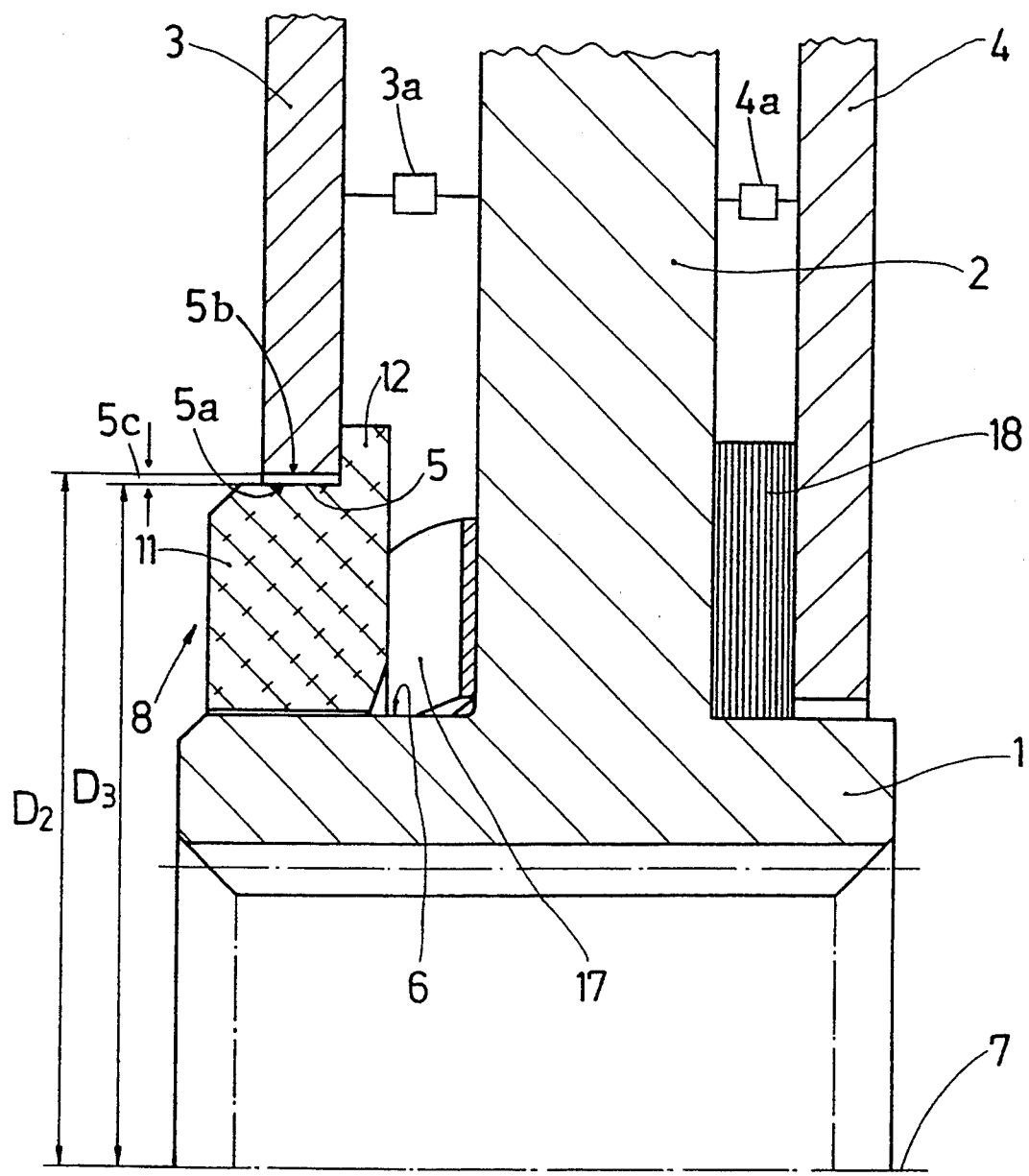
FIG. 1a is substantially the same view as FIG. 1 but shows additional components.

In other words, FIG. 1 shows hub plate 2 oriented in a perpendicular fashion with respect to the hub 1, which hub 1 has a center of rotation along the axis of rotation 7. Two cover plates, 3 and 4, are located on opposite sides of the hub plate 2 and preferably run parallel to the hub plate 2. Cover plates 3 and 4 may preferably be connected to one another in outer circumferential areas, not illustrated in FIG. 1. Such a connection between cover plates 3 and 4 preferably serves to hold the two cover plates 3 and 4 at a distance from one another. In addition, a spring 3a, as shown in FIG. 1a, is preferably located between the hub plate 2 and the cover plate 3. Likewise, another spring 4a, is preferably located between the hub plate 2 and the cover plate 4. Springs 3a and 4a preferably permit some rotational movement between the hub plate 2 and each cover plate 3 and 4.

The hub 1 preferably has an outer cylindrical area 6 located on the same side of the hub plate 2 as cover plate 3. This cylindrical area, in conjunction with the plastic ring 8, may preferably serve as a guide for cover plates 3 and 4. Cover plates 3 and 4 are braced by the plastic ring 8, which plastic ring 8 is in contact with the cylindrical area 6 of the hub 1. The plastic ring 8 preferably braces cover plates 3 and 4 by fitting into an opening 5 located on the inner circumferential area of the cover plate 3. The plastic ring 8 essentially guides the cover plate 3, and since cover plates 3 and 4 are preferably firmly connected to one another in their outer circumferential areas, cover plate 3 will essentially serve to guide cover plate 4.

The plastic ring 8 is preferably stressed away from the hub plate 2 by a zig-zag spring 17, which is located between hub plate 2 and the plastic ring 8. Generally the zig-zag spring 17 is preferably configured to provide a biasing force to generate a frictional force which acts upon the cover plate 4 and the hub plate 2. To accomplish this, the zig-zag spring 17 preferably stresses the plastic ring 8, and pushes the plastic ring 8 in an axial direction away from the hub plate 2. The axial movement of the plastic ring 8 essentially causes the cover plate 3 to move away from the hub plate 2, which, in turn, because of the rigid connection between cover plate 3 and cover plate 4, causes the cover plate 4 to move towards the hub plate 2. The movement by cover plate 4 towards the hub plate 2 thence causes stress in a friction ring 18, located between the cover plate 4 and the hub plate 2. The friction ring 18, stressed by the movement of cover plate 4, will thence preferably generate a frictional force between the hub plate 2 and cover plate 4. Conceivably, the friction ring 18 may be attached to either the hub plate 2 or to the cover plate 4. In an alternative embodiment, the friction ring 18 may fit loosely in the space between the hub plate 2 and the cover plate 4.

Figure 2:
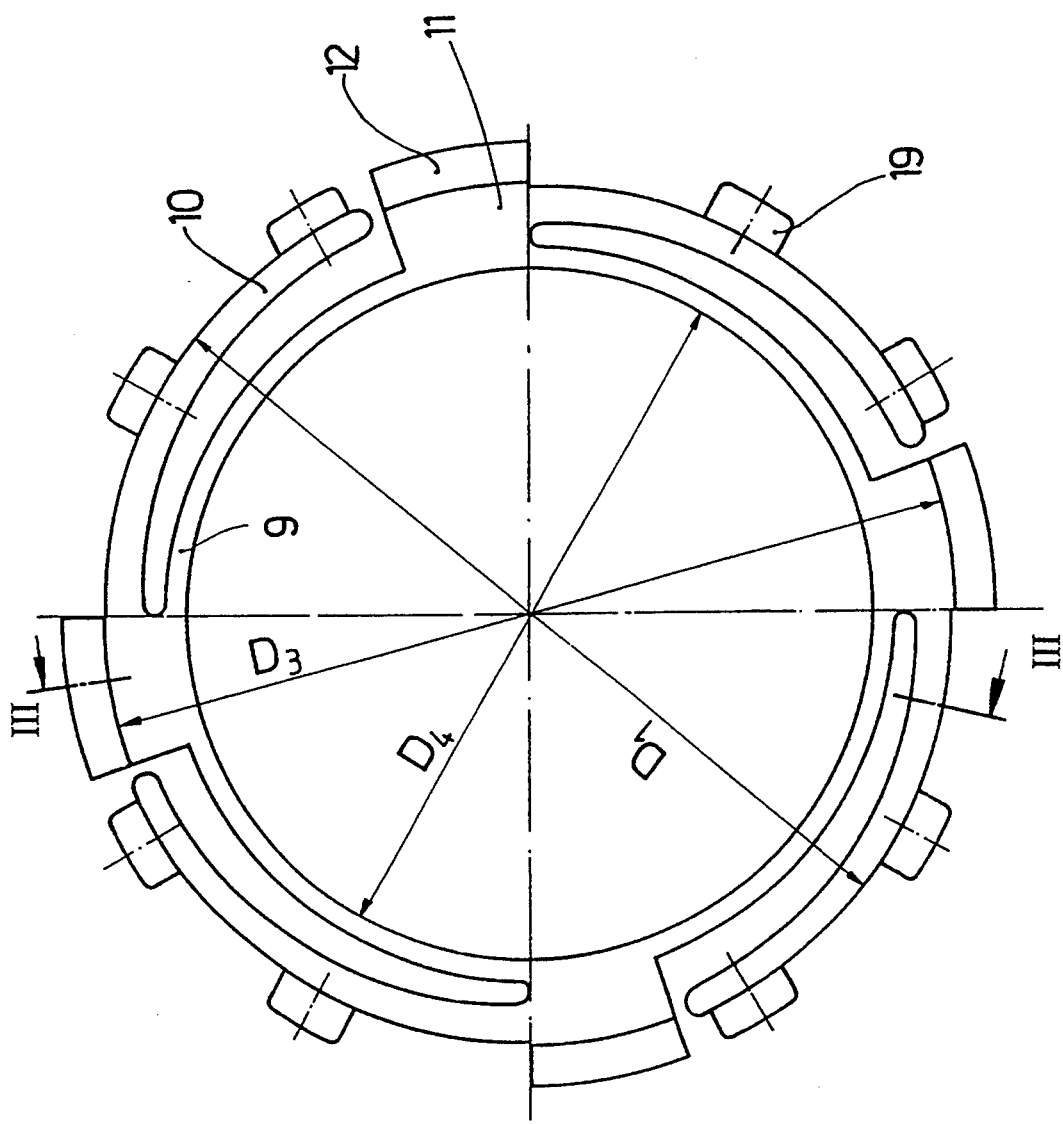
FIGS. 2 and 2aa show plan views of the plastic ring.

FIG. 2 is a plan view of the plastic ring 8, and FIG. 3 is a cross section taken along Line III—III in FIG. 2. The plastic ring 8 has an inner area 9, which is preferably closed in the circumferential direction. This inner area 9 has a diameter D4, which has a clearance fit in relation to the cylindrical area 6 of the hub 1. Starting from the inner area 9, there are preferably several blocks 11 distributed around the circumference of the plastic ring 8, which point radially outward. These radial blocks 11 have a diameter D3, which is smaller by the radial spring travel between the plastic ring 8 and the cover plate 3 than the central opening 5 with its diameter D2. In addition, each of the blocks 11 has a radially projecting lug 12 which acts as an axial stop between the blocks 11 and the inner wall of the cover plate 3. A radially resilient tongue projects from each block 11 in the circumferential direction, and the ends of these tongues pointing away from the block are exposed. When the plastic ring 8 is not deformed, the radially outer surface parts of the tongues 10 have a diameter D1, which is greater than the diameter D2 of the central opening 5 in the hub plate 3 (See FIG. 1). If the plastic ring 8 is inserted into the central opening 5 of the cover plate 3, then the tongues 10, as a result of their natural radial elasticity, lie close in the central opening 5 under internal or residual stress. They thus center the plastic ring 8 in relation to the central opening 5 in the cover plate 3. The tongues 10 are thereby advantageously designed so that at the maximum spring travel, the stresses in the material have approximately the same magnitude over the entire circumference. To axially secure the plastic ring 8 in relation to the cover plate 3, the tongues 10 can also be provided with radially projecting lugs 19.

In other words, FIG. 2 shows the plastic ring 8 with an inner area 9. Inner area 9 is preferably closed in a circumferential direction and has an inner diameter of D4. A number of blocks 11 are preferably located around the circumference of the plastic ring 8. The blocks 11 preferably begin at the inner surface of inner area 9 and have a diameter of D3 (shown in FIGS. 1 and 2). The diameter D3 of the blocks 11 is preferably less than the diameter D2 of the central opening 5 located on the cover plate 3 (See FIG. 1). The difference in diameters D2 and D3 provides for some amount of play 5c between the surface 5a of the plastic ring 8 and the surface 5b of the cover plate 3 (shown in FIG. 1a). In addition, a lug 12 is preferably located on each block 11 with each such lug 12 preferably being disposed along the inner side of cover plate 3. The lug 12 essentially serves to keep the cover plate 3 in correct axial alignment with the plastic ring 8.

Preferably extending from each block 11, around the outer circumference of the plastic ring 8, are tongues 10. The tongues 10 preferably each extend in a circumferential direction of the plastic ring 8. Diameter D1, which is preferably measured to the outermost surface of each tongue 10, is preferably greater than the diameter D2 of the central opening 5. There exists a circumferentially disposed gap between each tongue 10 and the inner area 9 of plastic ring 8, allowing each tongue 10 to be flexibly displaceable towards the inner portion 9 of plastic ring 8 in response to a radially inward compressive force on the plastic ring 8. As a result, when the plastic ring 8 is inserted into the central opening 5 of the cover plate 3, the tongues 10 are compressed as a result of their elasticity, towards the inner area 9 of the plastic ring 8. Preferably, the design of the tongues 10 generally causes the plastic ring 8 to be centered with respect to the central opening 5 of cover plate 3. The area of play or space 5c between the surface 5a of the plastic ring 8 and the surface 5b of the cover plate 3 (shown in FIG. 1a) is preferably substantially uniform around the circumference of the plastic ring 8. The uniform space 5c around the circumference of the plastic ring 8 may contribute to the equal distribution of stress along the circumference of the plastic ring 8.

Figure 2A:
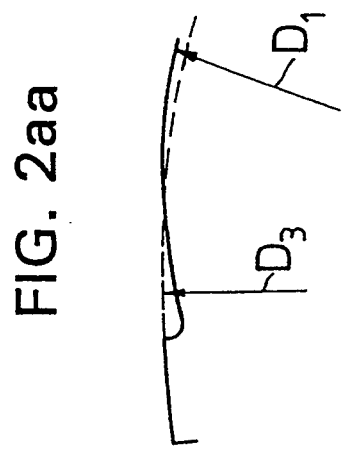
Figure 2A:
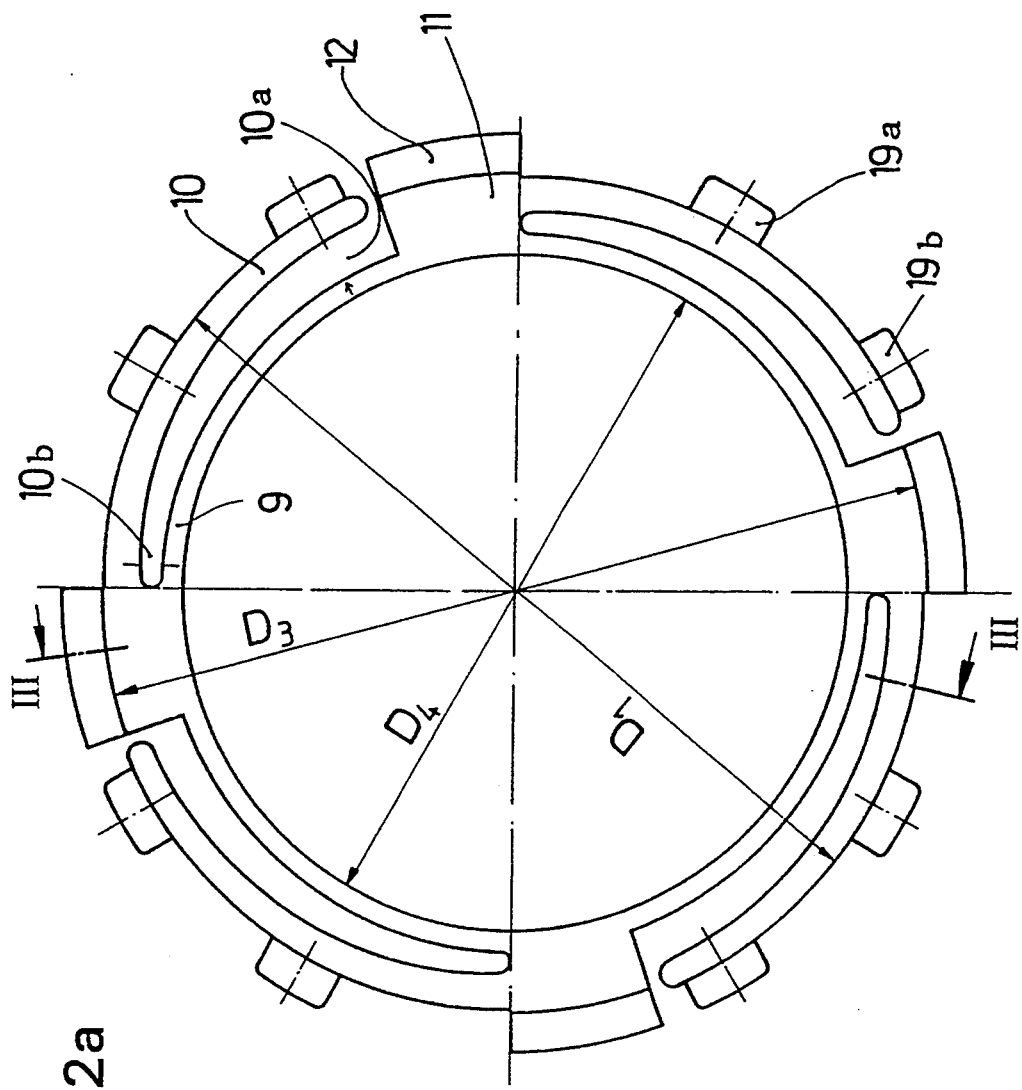
Figure 2B:

In a preferred embodiment of the present invention, the plastic ring 8 preferably has four tongues 10 distributed along the outer circumference of the plastic ring 8. The origin of each tongue 10 is preferably located about 90 degrees from the origin of adjacent tongue 10. Each tongue 10 preferably has an arc length of about 85 degrees. The space represented by a radial dimension 10a between the end of the tongue 10 and the outer surface of inner area 9 is preferably greater than the space represented by a radial dimension 10b between the beginning of the tongue 10 and the outer surface of inner area 9 (shown in FIG. 2a).

In addition, the number of blocks 11 and lugs 12 preferably corresponds to the number of tongues 10 located on the plastic ring 8. Accordingly, the blocks 11 are preferably located 90 degrees from each other. Each tongue 10 may also have up to two smaller lugs 19a and 19b distributed along the outer surface of tongue 10 (see FIG. 2a). The first lug 19a is preferably located about midway along the circumferential extent of the tongue 10. The second lug 19b is preferably located at an arc length of about 20 degrees from the first lug 19a.

As shown in particular in FIG. 3, the inner area 9 of the plastic ring 8 is preferably recessed by a distance X in relation to the surface 13 facing the hub plate 2. This distance X may preferably assure that the inner area 9 is independent in relation to the zig-zag spring 17, and that the two cannot readily influence one another.

Figure 3A:
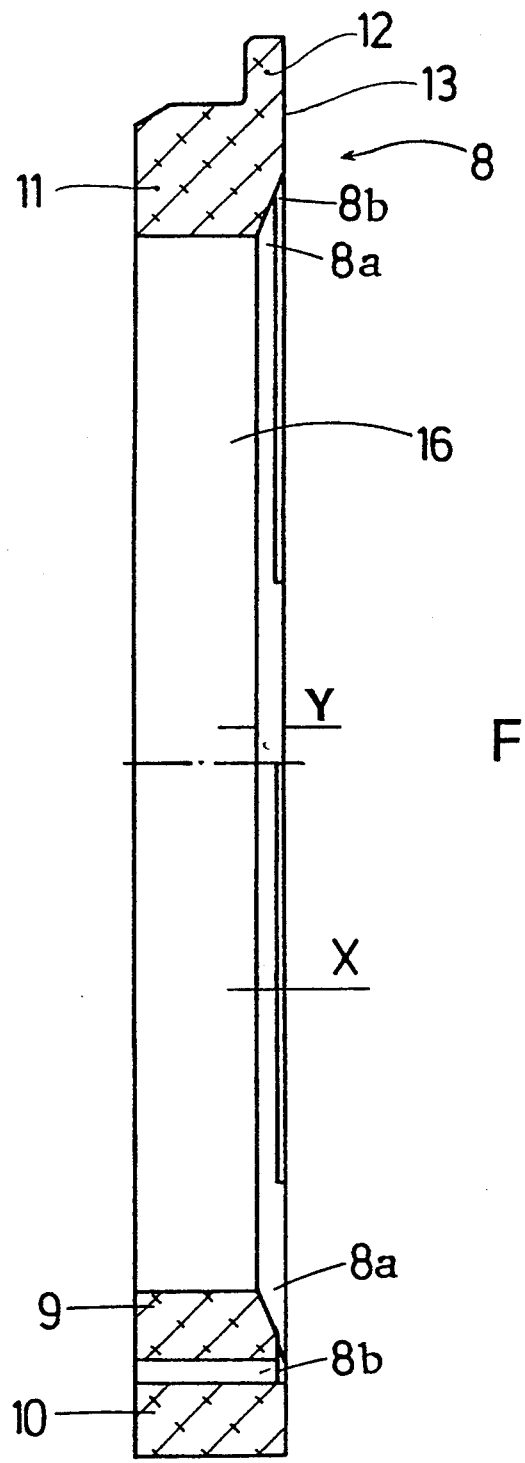
FIG. 3a is substantially the same view as FIG. 3 but shows additional components.

In other words, the inner area 9 of the plastic ring is recessed by the distance Y in relation to the surface 13 facing the hub plate 2 (shown in FIG. 3a). The inner circumferential area of inner area 9 is preferably beveled along edges 8a. Further, additional portions 8b of the inner area 9 are preferably cut out or recessed by the distance X in relation to the surface 13 facing the hub plate 2. The distance X may serve to assist the function of the zig-zag spring 17. The distance X may also serve to prevent any influence by the zig-zag spring on the inner area 9.

Figure 4A:
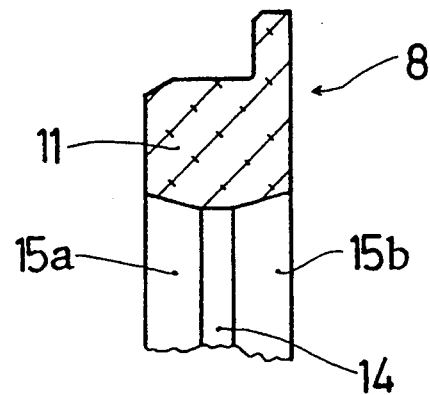
FIG. 4a is substantially the same view as FIG. 4 but shows additional components.

FIG. 4 shows an inner shape of the plastic ring 8 which differs from the one illustrated in FIG. 3. In FIG. 3, contact surface 16 runs over essentially the entire axial extent of the inner area 9, while in FIG. 4 the contact surface 14 is reduced to a relatively narrow strip by the placement of bevels 15 starting at the respective end surfaces of the plastic ring 8. This reduction of the contact surface 14 is designed to preferably facilitate a tipping motion between the cover plates 3 and 4 and the hub 1, if the particular installation so requires. The bevels 15 are illustrated as two separate bevels 15a and 15b in FIG. 4a.

Figure 5:
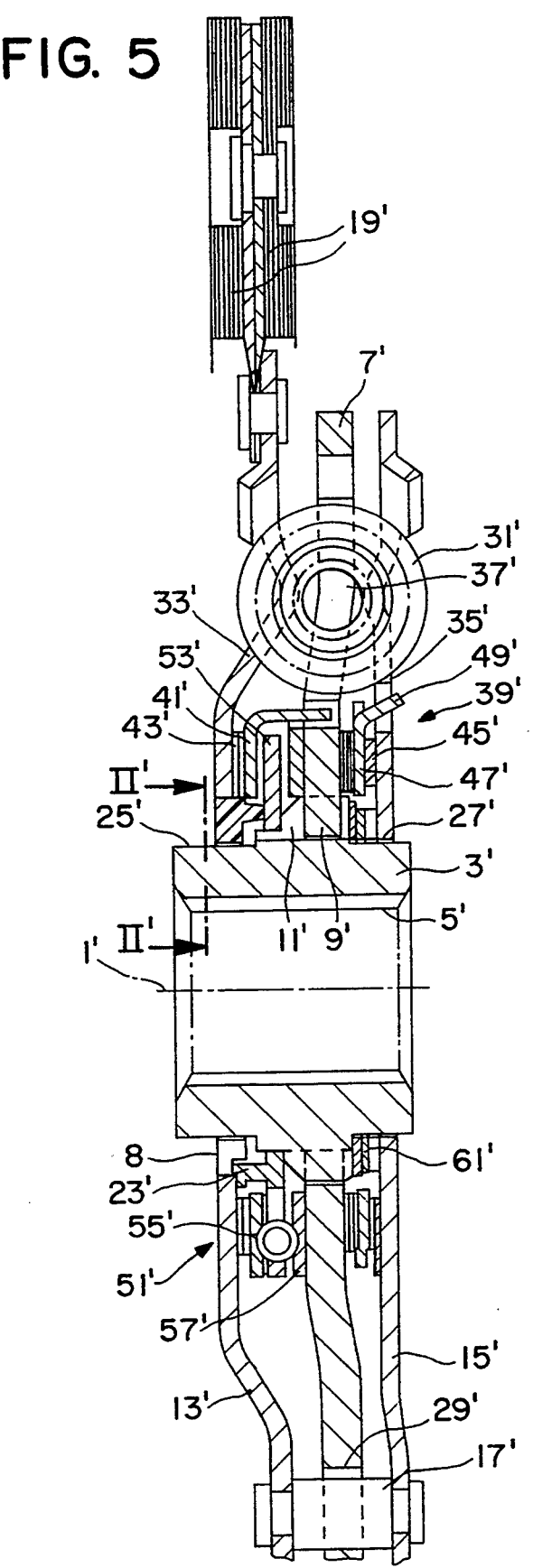
FIG. 5 shows a sectional view of a clutch disc of a motor vehicle friction clutch.

FIG. 5 shows an example of a clutch disc in which a plastic ring 8 according to the present invention could conceivably be installed. Particularly, FIG. 5 shows a clutch disc comprising a hub 3' which is coaxial with an axis of rotation 1' of a gearbox input shaft not shown in detail and can be coupled nonrotatably but axially movably to the gearbox shaft via its internal teeth 5'. The hub 3' carries an annular disc shaped, substantially radially projecting hub disc 7' which is coupled non-rotatably via internal teeth 9' but with limited rotational clearance to external teeth 11' of the hub 3'. Lateral discs 13'y and 15' are arranged axially on either side of the hub disc 7' and are connected rigidly by spacer rivets 17' to form a unit. The lateral disc 13' carries clutch friction linings 19". The lateral disc 13' provided with the clutch friction linings 19' is rotatably mounted axially to the side of the hub disc 7' on a cylindrical outer peripheral face 25' of the hub 3' via a plastic ring 8 as shown in more detail in FIG. 1. The plastic ring 8 can preferably be inserted into a central opening 23' in the lateral disc 13". The hub 3' passes with radial clearance through a central opening 27' in the other lateral disc 15". The spacer rivets 17' penetrate openings 29' in the hub disc 7' and simultaneously limit the angle of rotation of the lateral discs 13' and 15' relative to the hub 3".

The lateral discs 13' and 15' are rotatably coupled to the hub disc 7' via several helical springs 31", which are mutually offset in the peripheral direction and of which only one is shown, and to the hub 3' via the teeth 9". The helical springs 31' rest in windows 33", 35", and 37' which are orientated axially relative to one another of the lateral discs 13' and 15" on the one hand and the hub disc 7' on the other hand. The springs 31' form a torsional vibration damper which is effective during operation under load and which is provided with a load frictional device 39' arranged between the lateral discs 13' and 15". The load frictional device 39' comprises a frictional ring 43' arranged between the lateral disc 13' and a thrust collar 41' supported on the hub disc 7' as well as a further frictional ring 45' which is supported on the hub disc 7' and is pressed by a spring washer 47' supported on the lateral disc 15' via a thrust collar 49' guided non-rotatably on the lateral disc 15' against the hub disc 7".

The load torsional vibration damper 39' is effective only after compensation of the rotational clearance of the teeth 9' and 11". The rotational clearance determines the operating range of a torsional vibration damper 51' which is designed for idling and comprises a further hub disc 53' held non-rotatably on the hub 3' and at least one helical spring 55' by means of which the hub 3' is rotatably coupled to the lateral disc 13". The spring 55' rests in recesses which are oriented axially to one another in a lateral disc 57' connected non-rotatably to the hub disc 7' and of the thrust collar 41' on the one hand and the hub disc 53' on the other hand. A frictional device designed for idling comprises an axially acting undulating spring 61' which is supported between the lateral disc 15' on the one hand and via a thrust collar on the hub 3' on the other hand.

During operation of the friction clutch, the friction linings 19' and therefore the lateral discs 13' and 15' rotate about the axis of rotation of the engine crankshaft, while the hub 3' rotates around the axis of rotation 1' of the gearbox input shaft. Alignment and inclination errors of the two shafts stress the components of the torsional vibration dampers 39' and 51', and in particular of the frictional devices thereof. To avoid alignment and inclination errors, the plastic ring 8 guides the lateral disc 13' radially resiliently on the hub 3'.

One feature of the invention resides broadly in the clutch plate with torsional vibration damper, in particular for friction clutches of motor vehicles, consisting of a hub with a hub plate, cover plates located on both sides of the hub plate which are firmly connected to one another and which can be rotated by a specified amount in relation to the hub plate against the force of springs, whereby the radial guidance of the parts which can rotate in relation to one another is provided by the one cover plate and a plastic ring inserted in a central opening of the cover plate, whereby the plastic ring is radially elastic within limits and sits on a cylindrical region of the hub, characterized by the fact that the plastic ring 8 has a circumferentially closed inner area 9 with the diameter D4, by means of which it is placed with a clearance fit on the cylindrical area 6 of the hub 1, and radially outside the inner area 9 has several curved, arc-shaped, radially resilient tongues 10 running in the circumferential direction and distributed over the circumference, by means of which it is inserted under radial prestress into the central opening of the cover plate 3 with the diameter D2.

Another feature of the invention resides broadly in the clutch plate, characterized by the fact that each tongue 10 is connected in its circumferential terminal area by means of a block 11 with the inner area 9, and each block 11 of the diameter D4 of the inner area 9 is solid up to the diameter D3, and the diameter D3 is smaller by the magnitude of the maximum spring travel than the central opening 5 in the cover plate 3 with the diameter D2.

Still another feature of the invention resides broadly in the clutch plate, characterized by the fact that for the axial guidance of the plastic ring 8 in relation to the inner wall of the cover plate 3, the plastic ring 8 has radially projecting lugs 12 at least in the vicinity of the blocks 11.

Yet another feature of the invention resides broadly in the clutch plate, characterized by the fact that the inner area 9 of the plastic ring 8 is recessed (by dimension X) in relation to the surface 13 facing the hub plate 2 of the hub 1.

Still yet another feature of the invention resides broadly in the clutch plate, characterized by the fact that the inner area 9 of the plastic ring 8 is provided, toward the cylindrical area 6 of the hub 1 with a narrow axial contact surface 14 by means of bevels 15 from both axial sides.

Yet still another feature of the invention resides broadly in the clutch plate, characterized by the fact that the plastic ring 8 is preferably made of reinforced plastic.

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The appended drawings, in their entirety, including all dimensions, proportions and/or shapes in at least one embodiment of the invention, are, if applicable, accurate and to scale and are hereby incorporated by reference into this specification.

The invention as described hereinabove in the context of the preferred embodiments is not to be taken as limited to all of the provided details thereof, since modifications and variations thereof may be made without departing from the spirit and scope of the invention.

What is claimed is:

1. In a transmission for a motor vehicle, a friction clutch, said friction clutch comprising a clutch plate, said clutch plate comprising:

a hub;

said hub comprising a hub plate;

said hub plate comprising a first side and a second side;

a first cover plate being disposed at said first side of sand hub plate;

a second cover plate being disposed at said second side of said hub plate;

a plastic ring disposed between said hub and said first cover plate, said plastic ring comprising an inner portion and an outer portion;

said inner portion of said plastic ring being disposed at said hub;

said outer portion of said plastic ring comprising:

resilient biasing means disposed at said outer portion of said plastic ring; and said resilient biasing means being disposed to resiliently bias said first cover plate away from said inner portion of said plastic ring;

said resilient biasing means comprising:

a plurality of radially resilient tongue means distributed along the circumference of said plastic ring;

said radially resilient tongue means being arc-shaped and being oriented in the circumferential direction along said plastic ring;

said hub further comprising a cylindrical area;

said inner portion of said plastic ring being disposed about said cylindrical area of said hub so as to form a first clearance between said inner portion and said cylindrical area;

said first cover plate comprising a central opening, said central opening being disposed towards said outer portion of said plastic ring;

said outer portion of said plastic ring being disposed within said central opening; and said central opening of said first cover plate and said outer portion of said plastic ring defining a second clearance therebetween.

2. The clutch plate according to claim 1 wherein:

said outer portion of said plastic ring comprises:
a plurality of blocks;

said plurality of radially resilient tongue means extend radially outwardly into contact with said central opening of said first cover plate;

said plurality of radially resilient tongue means are configured for permitting and permit movement of said first cover plate within said second clearance;

said plurality of blocks are configured for limiting and limit movement of said first cover plate within said second clearance; and said second clearance has an outer maximum diameter defined by said plurality of radially resilient tongue means disposed within said central opening, and an inner maximum diameter defined by said plurality of blocks.

3. The clutch plate according to claim 1 wherein:

said plurality of blocks comprise a surface disposed radially inward from said central opening of said first cover plate; and said surfaces of said plurality of blocks are configured for limiting and limit a radially inward movement of said first cover plate within said second clearance, said surfaces defining said inner maximum diameter of said second clearance.

4. The clutch plate according to claim 3 wherein:

each said radially resilient tongue means corresponds to one of said plurality of blocks; and each said radially resilient tongue means is connected to its corresponding block.

5. The clutch plate according to claim 4 wherein:

each said block comprises a block lug;

said block lugs radially project from said blocks;

said block lugs are disposed substantially perpendicular to said surfaces of said plurality of blocks; and said block lugs are disposed axially adjacent said central opening of said first cover plate and extend radially beyond said central opening to provide for axial guidance of said plastic ring.

6. The clutch plate according to claim 5 wherein:

said plastic ring comprises a first lateral surface area facing said hub plate;

said plastic ring comprises a recessed portion being disposed in said inner portion of said plastic ring, said recessed portion being recessed in relation to said first lateral surface area of said plastic ring.

7. The clutch plate according to claim 6 wherein:

said inner portion of said plastic ring comprises an inner surface;

said first lateral surface area and said inner surface of said plastic ring comprise a first bevel between said first lateral surface area and said inner surface.

8. The clutch plate according to claim 7 wherein:

said plastic ring comprises a second lateral surface area opposite said first lateral surface area;

a second bevel is disposed between said second lateral surface area and said inner surface;

said first and second bevels provide a narrowed axial contact surface between said inner portion and said cylindrical area to facilitate a tipping motion between said first cover plate and said hub.

9. The clutch plate according to claim 8, wherein:

said clutch plate is disposed about a toothed drive shaft;

said plastic ring comprises reinforced plastic;

said hub comprises teeth;

said teeth being configured to engage and engaging said hub on the toothed drive shaft;

said first cover plate comprises a radially outer area;

said second cover plate comprises a radially outer area;

said first cover plate and said second cover plate are firmly connected to one another between said radially outer area of said first cover plate and said radially outer area of said second cover plate;

said clutch plate comprises a first further biasing means and a second further biasing means;

said first further biasing means being disposed between said first cover plate and said hub plate;

said second further biasing means being disposed between said second cover plate and said hub plate;

said clutch plate comprises a zig-zag spring;

said zig-zag spring being configured to provide and providing an axial biasing force on said plastic ring;

said clutch plate comprises a friction ring;

said friction ring being configured to provide and providing friction between said hub plate and said second cover plate;

said inner portion of said plastic ring has an inner diameter;

each of said block lugs comprise a first portion disposed immediately adjacent its corresponding one of said plurality of blocks;

each of said block lugs comprise a second portion disposed radially away from said first portion;

each of said blocks have a diameter defined up to said first portion of said block lugs;

said first cover plate has an inner diameter defined by said central opening, said inner diameter of said first cover plate being greater than said diameter of said blocks;

said first cover plate has an outer diameter disposed substantially concentrically about said inner diameter of said first cover plate;

each said radially resilient tongue means comprises:
an outer surface;

an outer diameter defined between said outer surface of each said radially resilient tongue means and said outer surface of an opposite said radially resilient tongue means;

an arc length and a width;

a first tongue lug and a second tongue lug;

said tongue lugs being disposed along said outer surface of said radially resilient tongue means;

said first tongue lug being disposed at a midpoint of said arc length of said radially resilient tongue means;

said second tongue lug being disposed about 20 degrees from said first tongue lug;

each said radially resilient tongue means being configured for centering and centering said plastic ring along said central opening of said first cover plate;

said plastic ring comprises solely four said radially resilient tongue means;

each said radially resilient tongue means is disposed at about 90 degree intervals from adjacent ones of said radially resilient tongue means;

each said radially resilient tongue means has an arc length of about 85 degrees;

said radially resilient tongue means comprises a terminal, flexible end and a fixed end;

said inner portion of said plastic ring and said terminal flexible end are disposed spaced apart to form a first gap;

said inner portion of said plastic ring and said fixed end are disposed spaced apart to form a second gap;

said first gap is greater than said second gap;

said second clearance between said outer portion of said plastic ring and said central opening of said first cover plate is uniform about the circumference of said plastic ring;

said radially resilient tongue means being configured to provide and providing for equal stress distribution along said outer portion of said plastic ring;

said blocks are equal in number to the number of said resilient tongue means;

said block lugs disposed on said blocks are equal in number to the number of said radially resilient tongue means;

said blocks being disposed about 90 degrees from each other;

said inner portion of said plastic ring is recessed by a first distance;

said first distance provides for the non-influencing of said inner portion of said plastic ring by said zigzag spring; and said bevels of said inner portion of said plastic ring are beveled so as to be recessed by a second distance.

10. The clutch plate according to claim 9 wherein:
said clutch plate comprises:
friction lining means;
said friction lining means being disposed on one of said first cover plate and said second cover plate.

11. A method of making a friction clutch for a transmission for a motor vehicle, said friction clutch comprising a clutch plate, said clutch plate comprising: a hub; said hub comprising a hub plate; said hub plate comprising a first side and a second side; a first cover plate being disposed at said first side of said hub plate; a second cover plate being disposed at said second side of said hub plate; a plastic ring disposed between said hub and said first cover plate, said plastic ring comprising an inner ..portion and an outer portion; said inner portion of said plastic ring being disposed at said hub; said outer portion of said plastic ring comprising: resilient biasing means disposed at said outer portion of said .plastic ring; said resilient biasing means being disposed to resiliently bias said first cover plate away from said inner portion of said plastic ring; said method comprising:

providing a hub;

configuring said hub to comprise a hub plate, said hub plate comprising a first side and a second side;

providing a first cover plate being disposed at said first side of said hub plate;

providing a second cover plate being disposed at said second side of said hub plate;

providing a plastic ring;

disposing said plastic ring between said hub and said first cover plate;

configuring said plastic ring to comprise an inner portion and an outer portion;

disposing said inner portion of said .plastic ring at said hub;

configuring said outer portion of said plastic ring to comprise a resilient biasing means disposed at said outer .portion of said plastic ring;

disposing said resilient biasing means to resiliently bias said first cover plate away from said inner portion of said plastic ring; to produce a clutch plate;

said providing of said biasing means comprises:
providing a plurality of radially resilient tongue means
distributed along the circumference of said plastic ring;
configuring each said radially resilient tongue means to
have an arc-shape;
orienting said radially resilient tongue means in the circumferential direction along said plastic ring;

said providing of said hub comprises:
providing a cylindrical area on an inner surface of said
hub;
disposing said inner portion of said plastic ring about said cylindrical area of said hub so as to form a first clearance between said inner portion and said cylindrical area of said hub;

said providing of said first cover plate comprises:
providing a central opening in said first cover plate;
disposing said central opening of said first cover plate
towards said outer portion of said plastic ring;
disposing said outer portion of said plastic ring within
said central opening; and
providing a second clearance defined between said central
opening of said first cover plate and said outer portion of said
plastic ring.

12. The method according to claim 11, said method further comprises the following steps:
configuring said outer portion of said plastic ring to comprise a plurality of blocks;
extending said plurality of radially resilient tongue means radially outwardly to make contact with said central opening of said first cover plate;
configuring said plurality of radially resilient tongue means for permitting movement of said first cover plate within said second clearance;
configuring said plurality of blocks for limiting movement of said first cover plate within said second clearance; and
configuring said second clearance to have an outer maximum diameter defined by said plurality of radially resilient tongue means disposed within said central opening,.and configuring said second clearance to have an inner maximum diameter defined by said plurality of blocks.

13. The method according to claim 12, said method further comprising the following steps:
configuring said plurality of blocks to comprise a surface disposed radially inwardly from said central opening of said first cover plate;
configuring said surfaces of said plurality of blocks such that said surfaces limit a radially inward movement of said first cover plate within said second clearance; and configuring said surfaces to define said inner maximum diameter of said second clearance.

14. The method according to claim 13, further comprising the steps of:
disposing said plurality of blocks on said outer portion of said plastic ring such that each said radially resilient tongue means corresponds to one of said plurality of blocks; and
connecting each said radially resilient tongue means to its corresponding block.

15. The method according to claim 14, wherein said providing of said blocks comprises:
providing a block lug for each said block;
disposing said block lug on each said block;
disposing said block lugs radially from said blocks and substantially perpendicular to said surfaces of said plurality of blocks; and
disposing said block lugs axially adjacent said central opening of said first cover plate such that said block lugs extend radially beyond said central opening to provide for axial guidance of said plastic ring.

16. The method according to claim 15, wherein said providing of said plastic ring comprises:
providing a first lateral surface area, said first lateral surface area facing said hub plate;
providing a recessed portion;
disposing said recessed portion in said inner portion of said plastic ring; and
recessing said recessed portion in relation to said first lateral surface area of said plastic ring.

17. The method according to claim 16, wherein:
said providing of said inner portion of said plastic ring comprises:
providing an inner surface of said inner portion of said plastic ring; and
disposing a first bevel between said first lateral surface area and said inner surface of said inner portion of said plastic ring;
said providing of said plastic ring comprises:
providing a second lateral surface area opposite said
first lateral surface area;
disposing a second bevel between said second lateral
surface area and said inner surface;
said first and second bevels providing a narrowed axial
contact surface between said inner portion and said
cylindrical area to facilitate a tipping motion between said
first cover plate and said hub.

18. The method according to claim 17 wherein:
said method further comprises the step of disposing said clutch plate about a toothed drive shaft;
said providing of said plastic ring comprises reinforced plastic;
said providing of said hub comprises: providing teeth;
configuring said teeth to engage said hub on said toothed drive shaft;
engaging said hub on said said toothed drive shaft by means of said teeth;
said providing of said first cover plate comprises:
providing a radially outer area;
said providing of said second cover plate comprises:
providing a radially outer area;
firmly connecting said first cover plate and said second cover plate to one another in said radially outer area of said first cover plate and said radially outer area of said second cover plate;
said providing of said clutch plate comprises:
providing a zig-zag spring;
configuring said zig-zag spring to provide an axial biasing force on said plastic ring;
said providing of said clutch plate comprises:
providing a friction ring;
configuring said friction ring to provide a frictional force between said hub plate and said second cover plate;
configuring said inner portion of said plastic ring to have an inner diameter;
configuring each of said block lugs to comprise a first portion disposed immediately adjacent its corresponding one of said plurality of blocks;
configuring each of said block lugs to comprise a second portion disposed radially away from said first portion;
configuring said blocks to have a diameter defined up to said first portion of said block lugs;
configuring said first cover plate to have an inner diameter defined by said central opening of said first cover plate, said inner diameter of said cover plate being greater than said diameter of said blocks;
configuring each said radially resilient tongue means to have an outer surface, each said radially resilient tongue means having a diameter defined between said outer surface of each said radially resilient tongue means and said outer surface of another said radially resilient tongue means;
configuring each said radially resilient tongue means to have an arc length and a width;
said providing of said radially resilient tongue means comprises:
providing a first tongue lug and a second tongue lug;
disposing said tongue lugs along said outer surface of said radially resilient tongue means;
disposing said first tongue lug at the midpoint of said arc length of said radially resilient tongue means;
disposing said second tongue lug at about 20 degrees from said first tongue lug;
centering said plastic ring along said central opening of said first cover plate by means of said radially resilient tongue means;
said providing of said plastic ring comprises:
providing solely four said radially resilient tongue means;
disposing said radially resilient tongue means at about 90 degree intervals from one another;
providing an arc length of about 85 degrees for each said radially resilient tongue means;
said providing of said radially resilient tongue means comprises:
providing a terminal, flexible end and a fixed end;
disposing spaced apart to form a first gap said inner portion of said plastic ring and said terminal, flexible end;
configuring said second clearance between said outer portion of said plastic ring and said central opening of said first cover plate to be uniform about the circumference of said plastic ring;
configuring said radially resilient tongue means to provide for equal stress distribution along said outer portion of said plastic ring;

configuring said blocks to be equal in number to the number of said radially resilient tongue means;
configuring said block lugs disposed on said blocks to be equal in number to the number of said radially resilient tongue means;
disposing said blocks about 90 degrees from each other;
configuring said inner portion to be recessed by a first distance;
configuring said recess by said first distance to provide for the non-influencing of said inner portion by said zig-zag spring;
configuring said bevels of said inner portion to be beveled so as to be recessed by a second distance;
said providing of said clutch plate comprises:
 providing friction lining means; and
 disposing said friction lining means on one of said first cover plate and said second cover plate.

* * * * *